United States Patent
Deaver et al.

(10) Patent No.: US 10,147,508 B2
(45) Date of Patent: Dec. 4, 2018

(54) REACTOR PRESSURE VESSEL ASSEMBLY INCLUDING A FLOW BARRIER STRUCTURE

(71) Applicants: Gerald A. Deaver, Wilmington, NC (US); Robin D. Sprague, Wilmington, NC (US)

(72) Inventors: Gerald A. Deaver, Wilmington, NC (US); Robin D. Sprague, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 316 days.

(21) Appl. No.: 14/577,364

(22) Filed: Dec. 19, 2014

(65) Prior Publication Data

US 2016/0180973 A1    Jun. 23, 2016

(51) Int. Cl.
*G21C 15/24* (2006.01)
*G21C 13/02* (2006.01)
(Continued)

(52) U.S. Cl.
CPC ............ *G21C 15/24* (2013.01); *G21C 13/02* (2013.01); *G21C 15/14* (2013.01); *G21C 15/16* (2013.01); *G21C 15/26* (2013.01); *Y02E 30/40* (2013.01)

(58) Field of Classification Search
CPC ...... G21C 15/16; G21C 15/26; G21C 19/307; F22B 1/123; F22B 1/143; F22B 37/268; F22B 37/306; F22B 37/327
(Continued)

(56) References Cited

U.S. PATENT DOCUMENTS 2,994,657 A * 8/1961 Petrick ............... G21C 1/08
376/267
4,834,935 A * 5/1989 Daigle ............... G21C 13/032
376/204
(Continued)

FOREIGN PATENT DOCUMENTS

JP          01197696 A      8/1989
JP          2008122143 A    5/2008
WO          2014076811 A1   5/2014

OTHER PUBLICATIONS

Machine Translation of JP2008122143.*
European Search Report and Opinion issued in connection with corresponding EP Application No. 15198748.4 dated Apr. 26, 2016.

*Primary Examiner* — Sharon M Davis
(74) *Attorney, Agent, or Firm* — Harness, Dickey & Pierce, P.L.C.

(57) ABSTRACT

A reactor pressure vessel assembly may include a housing surrounding a reactor core, steam separators, and a chimney. Inner surfaces of the chimney and reactor core define a conduit for transporting a two phase flow stream from the reactor core through the chimney to the steam separators. The housing defines an opening. An inner surface of the housing and outer surfaces of the chimney and reactor core define an annulus in fluid communication with the opening and conduit. A feedwater sparger in the housing is connected to the at least one opening and configured to deliver a sub-cooled feedwater into the annulus. A flow barrier structure between the chimney and the steam separators may force mixing between the sub-cooled feedwater and a downcomer fluid from the steam separators. An outer steam separator may be vertically over a portion of the flow barrier structure in a plan view.

20 Claims, 17 Drawing Sheets

(51) Int. Cl.
*G21C 15/14* (2006.01)
*G21C 15/16* (2006.01)
*G21C 15/26* (2006.01)

(58) Field of Classification Search
USPC .......................................................... 376/347
See application file for complete search history.

(56) References Cited

U.S. PATENT DOCUMENTS

| | | | | |
|---|---|---|---|---|
| 4,912,733 A | * | 3/1990 | Gluntz | B04C 3/06 |
| | | | | 376/371 |
| 5,353,319 A | * | 10/1994 | Challberg | G21C 13/02 |
| | | | | 376/286 |
| 5,963,611 A | * | 10/1999 | Narabayashi | B01D 53/24 |
| | | | | 376/371 |
| 2007/0274428 A1 | * | 11/2007 | Chaki | G21C 1/084 |
| | | | | 376/308 |

* cited by examiner

REACTOR PRESSURE VESSEL ASSEMBLY INCLUDING A FLOW BARRIER STRUCTURE

BACKGROUND

Field

The present disclosure relates to a reactor pressure vessel assembly including a flow barrier structure and/or a method of manufacturing the reactor pressure vessel assembly.

Description of Related Art

FIG. 1 is a cross-sectional view of a conventional natural circulation reactor pressure vessel assembly. FIGS. 2-4 are a plan view, a cross-sectional view, and a perspective view, respectively, of a portion of the reactor pressure vessel assembly in FIG. 1.

Referring to FIGS. 1-4, the reactor pressure vessel assembly 100 includes a housing H that surrounds a core inlet region 114, a shroud 104, a reactor core 112, a chimney assembly 108, and steam separators 118. The reactor core 112 is over the core inlet region 114. The chimney assembly 108 is between the steam separators 118 and the reactor core 112. The steam separators 118 are over the chimney assembly 108. The reactor core 112 may be defined by an inner surface of the shroud 104, a core plate 116 secured to a bottom of the shroud 104, and a top guide 120 secured to a top of the shroud 104. The shroud 104 may be a hollow cylindrical structure that separates the reactor core 112 from the downcomer annulus flow in the annulus A. The core plate 116 may support control rods and fuel assemblies that include a plurality of fuel rods in the reactor core 112. The top guide 120 may provide lateral support to the top of the fuel assemblies. The core plate 116 may support the control rods laterally. The control rods may be vertically supported by control rod guide housings that are welded to a bottom head in the reactor pressure vessel assembly.

The chimney assembly 108 includes a chimney barrel B, chimney partitions C, a chimney head CH, and a plenum 106. An inner surface of the chimney barrel B defines a space between the reactor core 112 and the steam separators 118. The plenum 106 is a portion of the space defined by the inner surface of the chimney barrel B between a lower surface of the chimney head CH and an upper surface of the chimney partitions C. A height of the plenum 106 may be about 2 meters, but is not limited thereto. The chimney partitions C are located inside the chimney barrel B. The chimney partitions C divide the space defined by the inner surface of the chimney barrel B into smaller sections.

The annulus A is defined by a space between an inner surface of the housing H and outer surfaces of the chimney assembly 108 (e.g., outer surfaces of the chimney barrel B) and reactor core 112 (e.g., outer surface of the shroud 104). Together, an inner surface of the chimney assembly 108 (e.g., inner surface of the chimney barrel B) and an inner surface of the reactor core 112 (e.g., an inner surface of the shroud 104) define a conduit for transporting a gas-liquid two phase flow stream from the reactor core 112 through the chimney assembly 108 to the steam separators 118.

The upward arrows in FIG. 1 indicate a flow direction of the gas-liquid two phase flow stream through the reactor core 112, chimney assembly 108, and steam separators 118. The chimney partitions C act to channel the gas-liquid two phase flow exiting the reactor core 112 into the chimney assembly 108 in order to limit cross flow and/or reduce the potential for recirculating eddies. The steam separators 118 may separate a gas portion of the gas-liquid two phase flow that flows through the steam separators 118 out a top of the reactor pressure vessel assembly 100, as indicated by the arrows above the steam separators 118 in FIG. 1. A remaining portion of the gas-liquid two phase flow that corresponds to the downcomer fluid from the steam separators 118 and steam dryer (not shown), referred to as separator downcomer flow, flows down from the top of the reactor pressure vessel assembly 100. The separator downcomer flow may come from two sources: a steam dryer (not shown) and a return from the steam separators 118. A substantial portion of the separator downcomer flow (e.g., about 97%) may come from the return flow of the steam separators 118 and a comparatively smaller portion (e.g., about 3%) of the separator downcomer flow may come from the steam dryer (not shown). However, the relative contributions to the separator downcomer flow from the return flow of the steam separators 118 and the steam dryer (not shown) are not limited to about 97% and about 3%, respectively, and may be different depending on operation conditions and/or variations in design. FIG. 3 illustrates a fluid level L of the separator downcomer flow, but the fluid level L of the separator downcomer flow may vary from the fluid level L indicated in FIG. 3 depending on operation conditions.

The reactor pressure vessel assembly 100 includes at least one feedwater sparger 126 in the housing H that is configured to deliver a sub-cooled feedwater into the annulus A. Each feedwater sparger 126 is connected to a corresponding feedwater opening defined by the housing H. The reactor pressure vessel assembly 100 may include a plurality of feedwater spargers 126 arranged in a circular pattern over the chimney assembly 108 and connected to a plurality of feedwater openings defined by the housing H. The housing defines a feedwater opening for each feedwater sparger 126. The annulus A is in fluid communication with the feedwater opening connected to the feedwater sparger 126 and the conduit for transporting of a gas-liquid two phase flow stream from the reactor core 112 through the chimney assembly 108 to the steam separators 118.

As shown in FIG. 3, a support plate 128 may be arranged a distance H1 above the chimney head CH, but below a height of the feedwater spargers 126. The support plate 128 may be secured to the chimney head CH. For example, the support plate 128 may be welded to the steam separator stand pipes SP. Chimney head bolds (not shown) may fit inside the support plate 128 through slip fit holes. The support plate 128 may support the outer stand pipes, and may support the chimney head bolts, laterally. The support plate 128 may have a ring structure with a width W1. From a plan view, as shown in FIG. 2, the feedwater spargers 126 expose the width W1 of the support plate 128 below. The steam separators 118 are over an area surrounded by the support plate 128, but the steam separators 118 may be arranged so they are not directly over the support plate 128 in a vertical direction. In other words, as shown in FIG. 2, the support plate 128 may surround the steam separators 118 in a plan view. As shown in FIG. 4, even though some of the outer steam separators 118 may be on top of stand pipes SP that partially contact the support plate 128, the steam separators 118 are not directly over a portion of the support plate 128 in a vertical direction. As shown in FIG. 4, only part of the circumference of the outer stand pipes SP is in contact with support plate 128 where the outer stand pipes intersect the support plate 128.

As indicated by the down arrows in the annulus A of FIG. 1 and the arrows in the core inlet region 114 of FIG. 1, the sub-cooled feedwater may flow down the annulus A through the core inlet region 114 into the reactor core 112. The arrows in FIG. 3 illustrate part of the separator downcomer flow may be redirected to flow around the feedwater sparger 126 and the support plate 128 into the annulus A. The mixture of the sub-cooled feedwater flowing in the annulus A with the portion of the separator downcomer flow that is redirected into the annulus A may be referred to as the annulus downcomer flow. In the reactor core 112, fuel rods may heat the annulus downcomer flow received from the core inlet region 114 and the portion of the separator downcomer flow received from the top of the reactor pressure vessel assembly 100 to provide the gas-liquid two phase flow stream that flows upward from the reactor core 112 through the chimney assembly 108 to the steam separators 118.

Complete mixing (and/or a desired level of mixing) between the separator downcomer flow and the sub-cooled feedwater does not occur. All (or substantially all) separator downcomer flow may be directed into the annulus A; however, at least a portion of the separator downcomer flow may bypass the sub-cooled feedwater and avoid mixing or reduce a degree of mixing. In the conventional natural circulation reactor pressure vessel assembly 100, there is incomplete mixing of the separator downcomer flow and the sub-cooled feedwater before delivery to the reactor core 112. A temperature of the sub-cooled feedwater is generally less than a temperature of the separator downcomer flow. Consequently, the incomplete mixing between the separator downcomer flow and sub-cooled feedwater may cause temperature variations into the fuel rods and supports for the fuel rods in the reactor core 112. Accordingly, improved mixing between the separator downcomer flow and sub-cooled feedwater before entry into the reactor core 112 is desired.

SUMMARY

Some example embodiments relate to a reactor pressure vessel assembly including a fluid mixing plenum.

Some example embodiments relate to a reactor pressure vessel assembly including a flow barrier structure.

According to an example embodiment, a reactor pressure vessel assembly includes a reactor core; steam separators over the reactor core; a chimney between the reactor core and the steam separators; a housing surrounding the reactor core, the chimney, and the steam separators; at least one feedwater sparger in the housing; and a flow barrier structure in the housing. An inner surface of the chimney and an inner surface of the reactor core define a conduit for transporting a gas-liquid two phase flow stream from the reactor core through the chimney to the steam separators. The housing defines at least one feedwater opening. An inner surface of the housing, an outer surface of the chimney, and an outer surface of the reactor core define an annulus in fluid communication with the at least one feedwater opening and the conduit. Each feedwater sparger is connected to a corresponding one of the at least one feedwater opening. Each feedwater sparger is configured to deliver a sub-cooled feedwater into the annulus. The flow barrier structure is spaced apart in a vertical direction over the chimney and below the steam separators. The flow barrier structure is configured to force mixing between the sub-cooled feedwater and a downcomer fluid from the steam separators. At least one of the outer steam separators may be vertically over a portion of the flow barrier structure in a plan view. At least one of the outer steam separators may be on top of an outer stand pipe, where the outer stand pipe may include a cross-section with an entire perimeter in contact with the flow barrier structure.

The flow barrier structure may have a ring shape. A height of the flow barrier structure in the housing may be about level with the at least one feedwater sparger.

The flow barrier structure may include stainless steel.

The at least one feedwater sparger may be a plurality of feedwater spargers arranged in a circular pattern over the chimney. The at least one feedwater opening may be a plurality of feedwater openings defined by the housing. The feedwater sparger may be connected to the feedwater openings.

A dam plate may be in the housing between the chimney and the steam separators. A distance between an outer edge of the dam plate and the inner surface of the housing may be greater than or equal to a distance between an outer edge of the flow barrier structure and the inner surface of the housing. A vertical distance between the dam plate and a top of the chimney may be different than a vertical distance between the flow barrier structure and the top of the chimney. The vertical distance between the dam plate and the top of the chimney may be less than the vertical distance between the flow barrier structure and the top of the chimney. Alternatively, the vertical distance between the dam plate and the top of the chimney may be greater than the vertical distance between the flow barrier structure and the top of the chimney. A diagonal distance between the outer edge of the dam plate and an inner surface of the flow barrier structure may be equal to or greater than a width of the annulus.

The reactor pressure vessel assembly may further include a backflow dam on the at least one feedwater sparger. The backflow dam may cover a top of the annulus. An edge of the backflow dam may be one of spaced apart from the inner surface of the housing and connected to the inner surface of the housing.

The flow barrier structure may have a tub shape. The flow barrier structure may be configured to force the downcomer fluid past and over the at least one fed-fluid sparger.

According to an example embodiment, a reactor pressure vessel assembly includes a reactor core; steam separators over the reactor core; a housing surrounding the reactor core and the steam separators; at least one feedwater sparger in the housing; and a flow barrier structure in the housing below the separators. An inner surface of the reactor core defines a conduit for transporting a gas-liquid two phase flow stream from the reactor core to the steam separators. The housing defines at least one feedwater opening. An inner surface of the housing and an outer surface of the reactor core define an annulus in fluid communication with the at least one feedwater opening and the conduit. Each feedwater sparger is connected to a corresponding one of the at least one feedwater opening. Each feedwater sparger is configured to deliver a sub-cooled feedwater into the annulus. The flow barrier structure is configured to force mixing between the sub-cooled feedwater and a downcomer fluid from the separators. A top of the flow barrier structure in housing is about level with the at least one sparger. At least one of the steam separators may be vertically over a portion of the flow barrier structure in a plan view. At least one of the outer steam separators may be vertically over a portion of the flow barrier structure in a plan view. At least one of the outer steam separators may be on top of an outer stand pipe, where the outer stand pipe may include a cross-section with an entire perimeter in contact with the flow barrier structure.

The flow barrier structure may have one of a ring shape and a tube shape.

The reactor pressure vessel assembly may further include a dam plate in the housing between the reactor core and the separators. A distance between an outer edge of the dam plate and the inner surface of the housing may be equal to or greater than a distance between an outer edge of the flow barrier structure and the inner surface of the housing. A vertical distance between the dam plate and a top of the reactor core may be different than a vertical distance between the flow barrier structure and the top of the reactor core.

According to an example embodiment, a method of manufacturing a reactor pressure vessel assembly includes disposing steam separators over a reactor core; disposing a chimney between the reactor core and the steam separators; disposing a housing surrounding the reactor core, the chimney, and the steam separators; disposing at least one feedwater sparger in the housing; and disposing a flow barrier structure in the housing. An inner surface of the chimney and an inner surface of the reactor core define a conduit for transport of a gas-liquid two phase flow stream from the reactor core through the chimney to the steam separators. The housing defines at least one feedwater opening. An inner surface of the housing, an outer surface of the chimney, and an outer surface of the reactor core define an annulus in fluid communication with the at least one feedwater opening and the conduit. The flow barrier structure is spaced apart in a vertical direction over the chimney and below the separators. The flow barrier structure is configured to force mixing between the sub-cooled feedwater and a downcomer fluid from the steam separators. At least one of the steam separators may be vertically over a portion of the flow barrier structure in a plan view. At least one of the outer steam separators may be vertically over a portion of the flow barrier structure in a plan view. At least one of the outer steam separators may be on top of an outer stand pipe, where the outer stand pipe may include a cross-section with an entire perimeter in contact with the flow barrier structure. The method further includes connecting each feedwater sparger to a corresponding one of the at least one feedwater opening. Each feedwater sparger is configured to deliver a sub-cooled feedwater into the annulus.

The flow barrier structure may have a ring shape. The disposing the flow barrier structure may include arranging the flow barrier structure at a height in the housing that is about level with the at least one feedwater sparger.

The flow barrier structure may include stainless steel.

The flow barrier structure may have a tub shape. The flow barrier structure may be configured to force the downcomer fluid past and over the at least one feedwater sparger.

The method may further include placing a dam plate in the housing between the chimney and the separators. A distance between an outer edge of the dam plate and the inner surface of the housing may be equal to or greater than a distance between an outer edge of the flow barrier structure and the inner surface of the housing. A vertical distance between the dam plate and a top of the chimney may be different than a vertical distance between the flow barrier structure and the top of the chimney.

The vertical distance between the dam plate and the top of the chimney may be greater than the vertical distance between the flow barrier structure and the top of the chimney. A diagonal distance between the outer edge of the dam plate and an inner surface of the flow barrier structure is greater than a width of the annulus.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
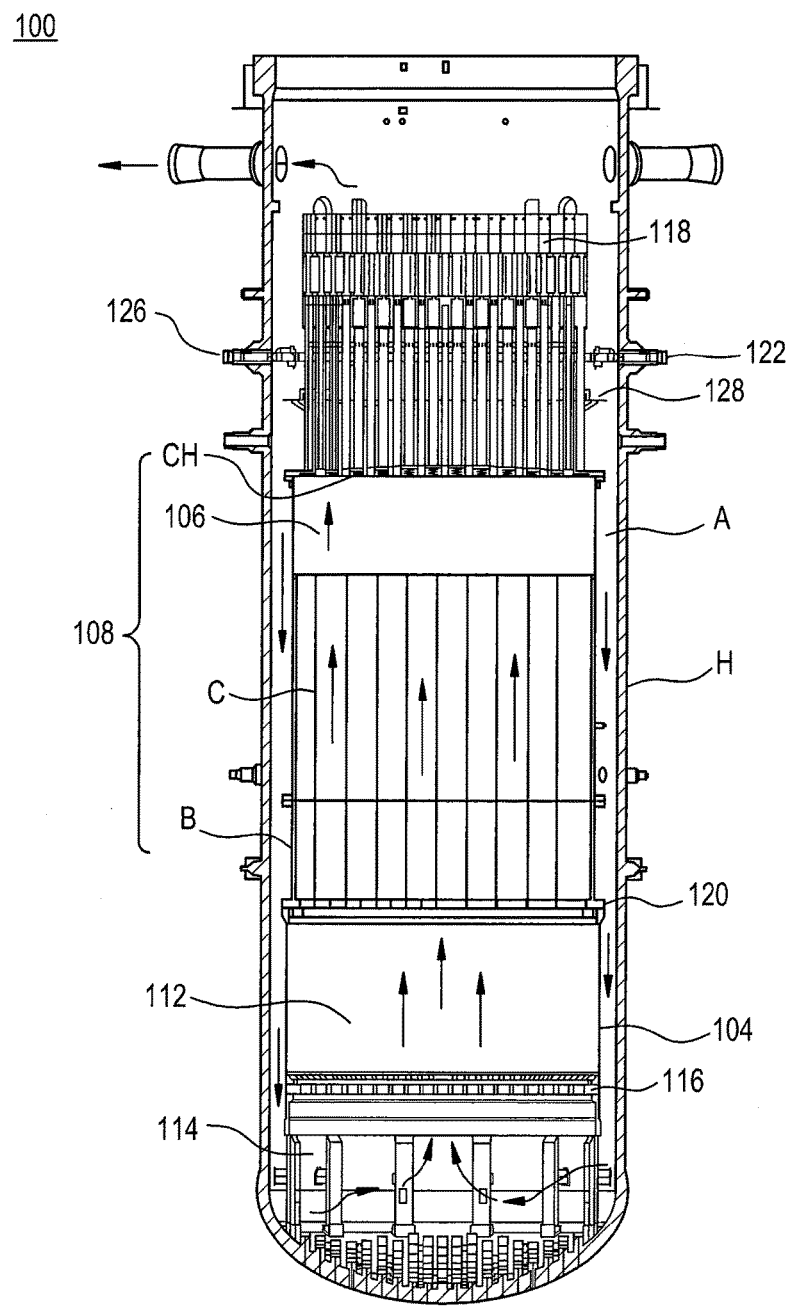
FIG. 1 is a cross-sectional view of a conventional natural circulation reactor pressure vessel assembly.
Figure 2:
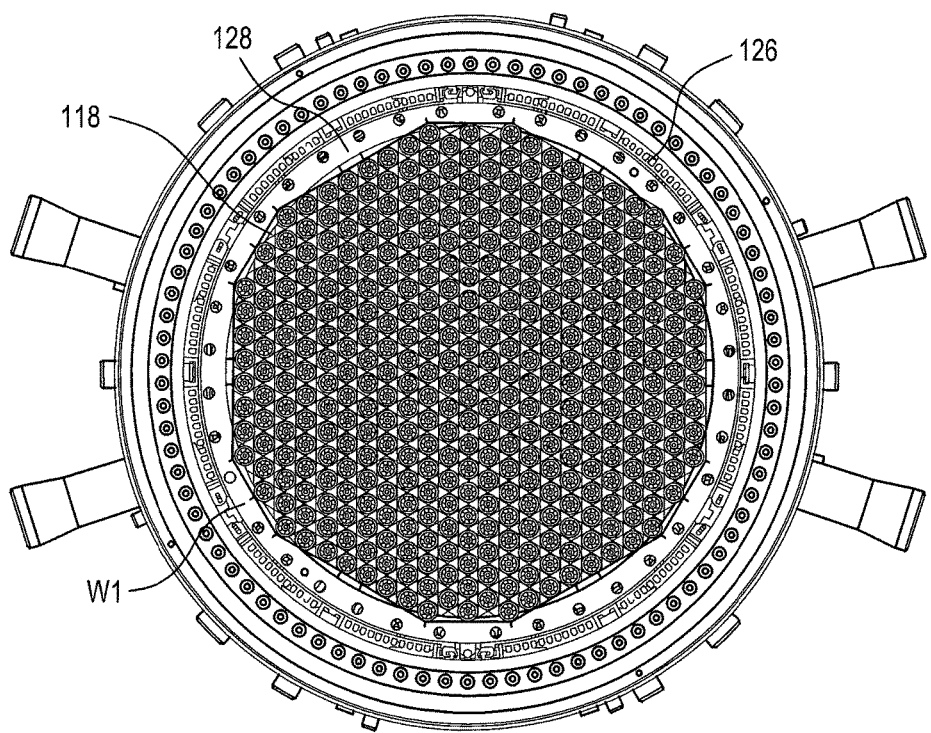
FIGS. 2-4 are a plan view, a cross-sectional view, and a perspective view, respectively, of a portion of the reactor pressure vessel assembly in FIG. 1.
Figure 3:
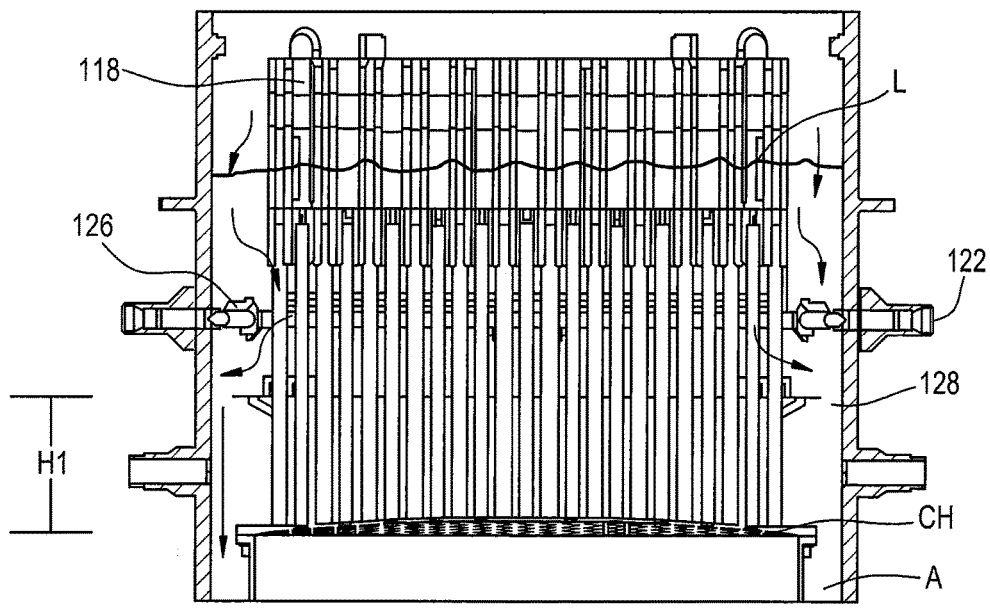
Figure 4:
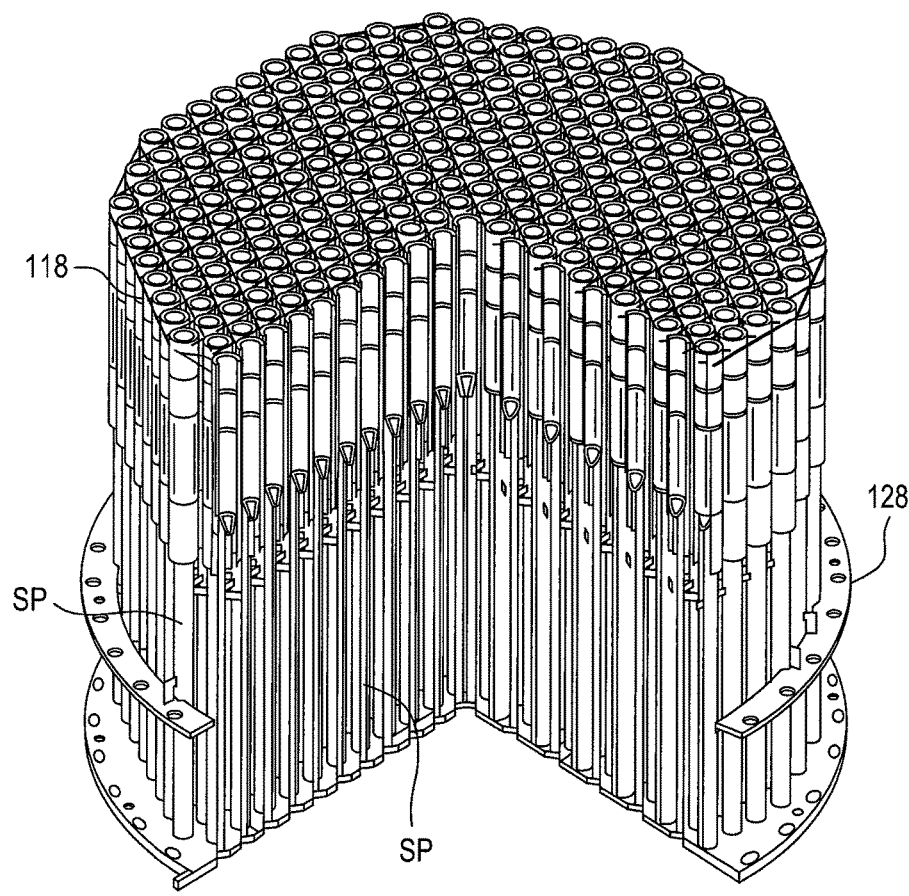

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 5:
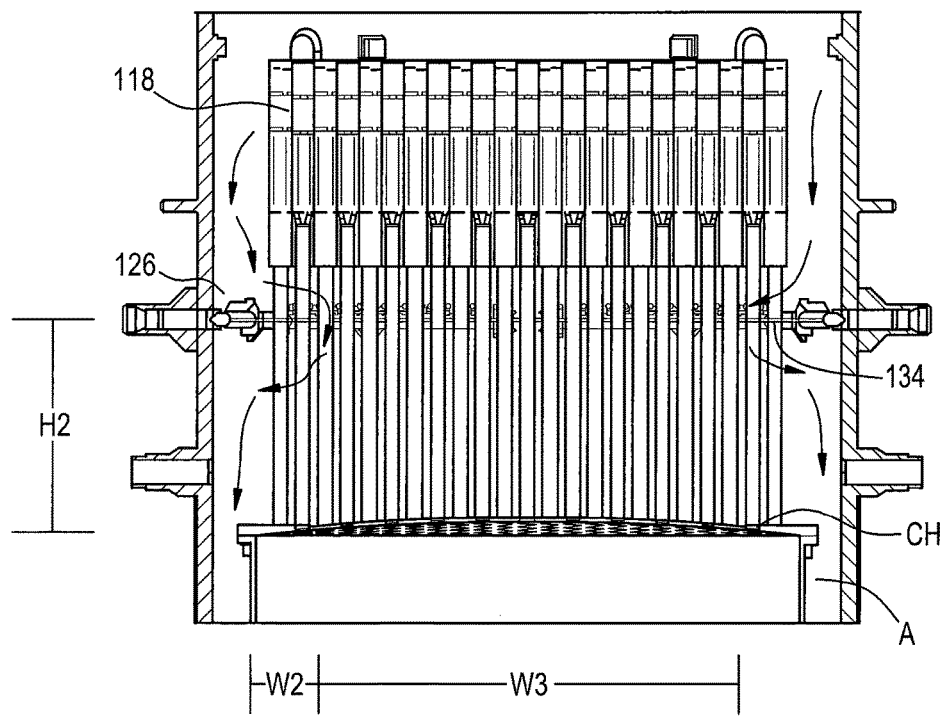
FIGS. 5-6 are a cross-sectional view and a perspective view, respectively, of a portion of a reactor pressure vessel assembly according to an example embodiment.
Figure 6:
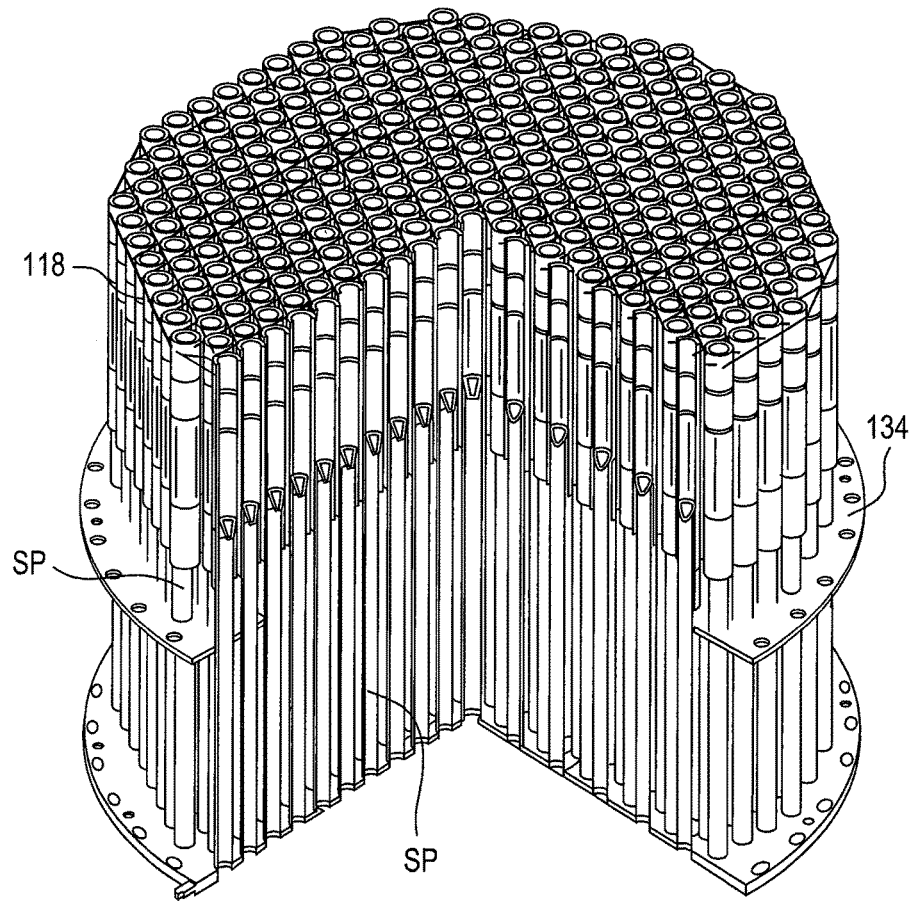

FIGS. 5-6 are a cross-sectional view and a perspective view, respectively, of a portion of a reactor pressure vessel assembly according to an example embodiment. The support plate 128 described previously with reference to FIGS. 1-4 may be omitted from the portion of the reactor pressure vessel assembly illustrated in FIGS. 5-6. Alternatively, although not illustrated, the portion of the reactor pressure vessel assembly in FIGS. 5-6 may further include the support plate 128 described previously in FIGS. 1-4. However, a non-limiting example is described below where the support plate 128 is omitted in order to avoid obscuring features of the portion of the reactor pressure vessel assembly in FIGS. 5-6.

Referring to FIGS. 5-6, the portion of the reactor pressure vessel assembly includes a flow barrier plate 134 as a flow barrier structure in the housing H. The flow barrier plate 134 is spaced apart in a vertical direction over the chimney assembly 108 (e.g., chimney head CH) and below the steam separators 118. The flow barrier plate 134 may force mixing between the sub-cooled feedwater that enters the housing H through the feedwater sparger 126 and the separator downcomer flow from the steam separators 118. The flow barrier plate 134 has a width W2 that is greater than a width W1 of the support plate 128 described in FIGS. 1-4. An inner width W3 of the flow barrier plate 134 (e.g., inner diameter) is less than an inner width (e.g., inner diameter) of the support plate 128 described in FIGS. 1-4.

As shown in FIGS. 5-6, some of the outer steam separators 118 may be directly over portions of the flow barrier plate 134 in the vertical direction. Consequently, some of the outer steam separators 118 may be connected to outer stand pipes SP that extend through portions of the flow barrier plate 134. For example, as shown in FIG. 6, some of the outer stand pipes SP may include a cross-section with an entire circumference in contact with the flow barrier plate 134. However, the inner stand pipes SP are not in contact with the flow barrier plate 134.

The flow barrier plate 134 may be formed of steel such as type 304 or 316 stainless steel, but is not limited to these materials. The flow barrier plate 134 may have a ring shape, but may be other shapes (e.g., polygon) depending on the shape of the housing H and/or chimney assembly 108. A height H2 of the flow barrier plate 134 in the housing H above the chimney assembly 108 (e.g., chimney head CH) may be about level with one of the feedwater spargers 126. However, height H2 shown in FIG. 5 is a non-limiting example and the height H2 of the flow barrier plate 134 may be adjusted relative to the feedwater sparger 126.

By positioning the flow barrier plate 134 adjacent to the feedwater sparger 126, the flow barrier plate 134 can create a flow barrier adjacent to the feedwater sparger 126, which forces the separator downcomer flow from the steam separators 118 and the sub-cooled feedwater entering through the feedwater sparger 126 to mix prior to moving through the annulus A. Additionally, because the flow barrier plate 134 has a width W2 that is greater than the width W1 of the support plate 128 in FIG. 1, a significant portion of the separator downcomer flow is redirected horizontally, which facilitates mixing before entering the annulus A.

As shown by the arrows in FIG. 5, the flow barrier plate 134 redirects the normal flow path of the separator downcomer flow and enables the sub-cooled feedwater additional time to mix with the redirected separator downcomer flow in the annulus A prior to entry into the reactor core 112. Accordingly, temperature variations of the sub-cooled feedwater and the separator downcomer flow may be reduced prior to entry into the reactor core 112.

A feedwater nozzle 122 (see FIG. 1) may be connected to each feedwater sparger 126 through the feedwater opening defined in the housing H. Although FIG. 1 illustrates the feedwater nozzle 122 is horizontally oriented, example embodiments are not limited thereto. For example, to help with the mixing process, the feedwater nozzle 122 may be directed upward at an angle of about 30 to 60 degrees. For example, the feedwater nozzles 122 may be tilted upward at an angle of about 45 degrees in order to create a mixing region which delays the sub-cooled feedwater from entering the normal flow path into the annulus A until the sub-cooled feedwater has had more time to mix with the separator downcomer flow.

Figure 7:
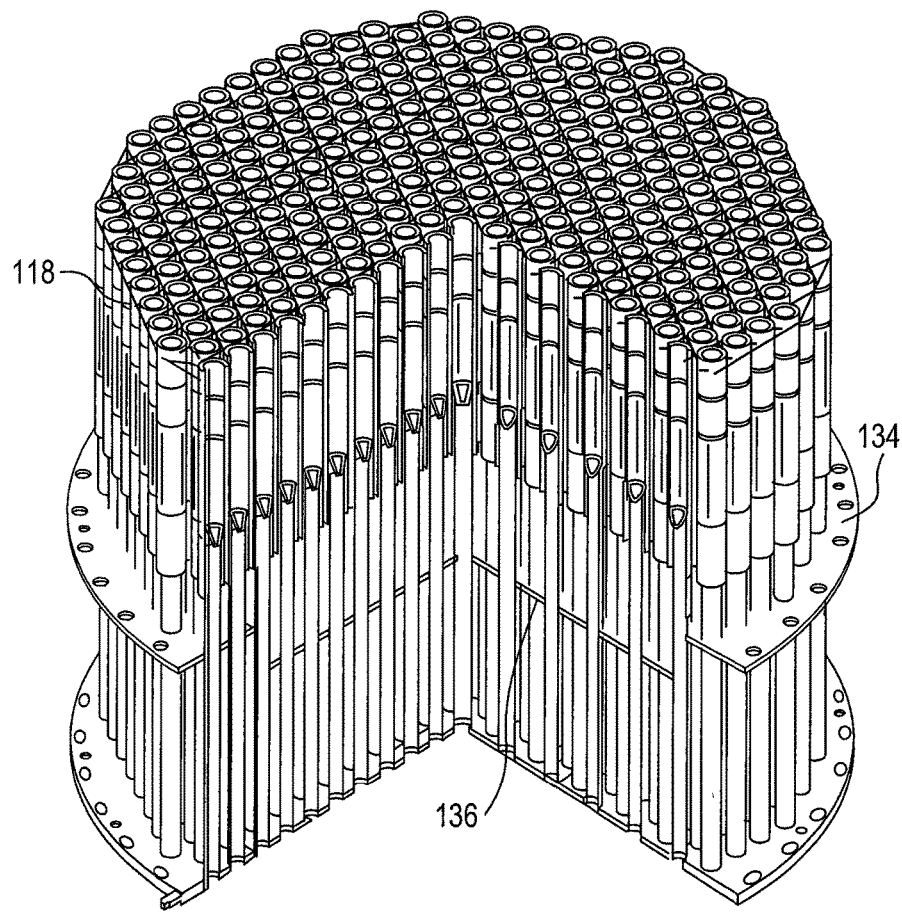
FIGS. 7-8 are a perspective view and a cross-sectional view, respectively, of a portion of a reactor pressure vessel assembly according to an example embodiment.
Figure 8:
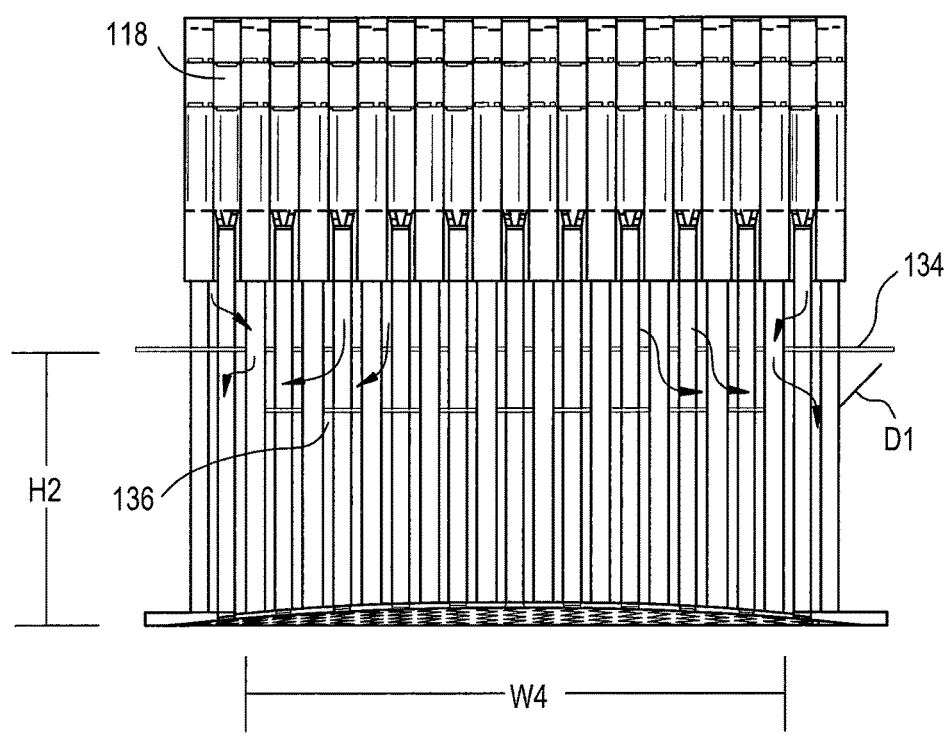

FIGS. 7-8 are a perspective view and a cross-sectional view, respectively, of a portion of a reactor pressure vessel assembly according to an example embodiment. Although not illustrated, the portion of the reactor pressure vessel assembly in FIGS. 7-8 may further include the support plate 128 described previously in FIGS. 1-4. However, a non-limiting example is described below where the support plate 128 is omitted in order to avoid obscuring features of the portion of the reactor pressure vessel assembly in FIGS. 7-8.

Referring to FIGS. 7-8, the portion of the reactor vessel assembly in FIGS. 7-8 is the same as the portion of the reactor vessel assembly in FIG. 5-6, except the portion of the reactor vessel assembly in FIGS. 7-8 further includes a lower dam 136 positioned in the housing H between the steam separators 118 and the chimney assembly 108 (e.g. chimney head CH). The lower dam 136 may also be referred to as a lower dam plate. A vertical distance between the lower dam 136 and the top of the chimney assembly 108 is different than a vertical distance between the flow barrier plate 134 and the top of the chimney assembly 108. For example, a height of the lower dam 136 above the chimney assembly 108 (e.g., chimney head CH) may be less than a height H2 of the flow barrier plate 134 above the chimney assembly 108 (e.g., chimney head CH). A width W4 of the lower dam 136 may be less than a width W3 of an inner surface of the flow barrier plate 134. The width W4 of the lower dam 136 may correspond to the outer diameter of the lower dam 136 if the lower dam 136 has a circular shape. The width W3 of the inner surface of the flow barrier plate 134 may correspond to the inner diameter of the flow barrier plate 134 if the flow barrier plate 134 has a ring shape.

The position of the lower dam 136 may be adjusted so the diagonal distance D1 between an edge of the lower dam 136 and an inner surface of the flow barrier plate 134 is tight enough to channel flow of the separator downcomer flow, but wide enough so the diagonal distance D1 is not too restrictive and/or does not create too much differential pressure as the separator downcomer flow is transported through the diagonal distance D1. For example, the position of the lower dam 136 may be adjusted so the diagonal distance D1 between the edge of the lower dam 136 and the inner surface of the flow barrier plate 134 may be greater than or equal to a width of the annulus A. The diagonal distance D1 may be greater than or equal to a flow area of the annulus A in a horizontal direction between an outer surface of the shroud 104 and the inner surface of the housing H. The diagonal distance D1 between the edge of the lower dam 136 and the inner surface of the flow barrier plate 134 may be about equal to a horizontal distance between an outer edge of the flow barrier plate 134 and an inner surface of the housing H. The diagonal distance D1 between the edge of the lower dam 136 and the inner surface of the flow barrier plate 134 may be greater than or equal to the horizontal distance D4 (see FIG. 11) between the outer surface of the chimney head CH and the inner surface of the housing H.

In FIG. 8, the arrows illustrate how the flow barrier plate 134 and the lower dam 136 redirect the flow of the separator downcomer flow around the lower dam 136 and flow barrier plate 134 through the diagonal distance D1 between the edge of the lower dam 136 and the inner surface of the flow barrier plate 134 into the annulus A.

Figure 9:
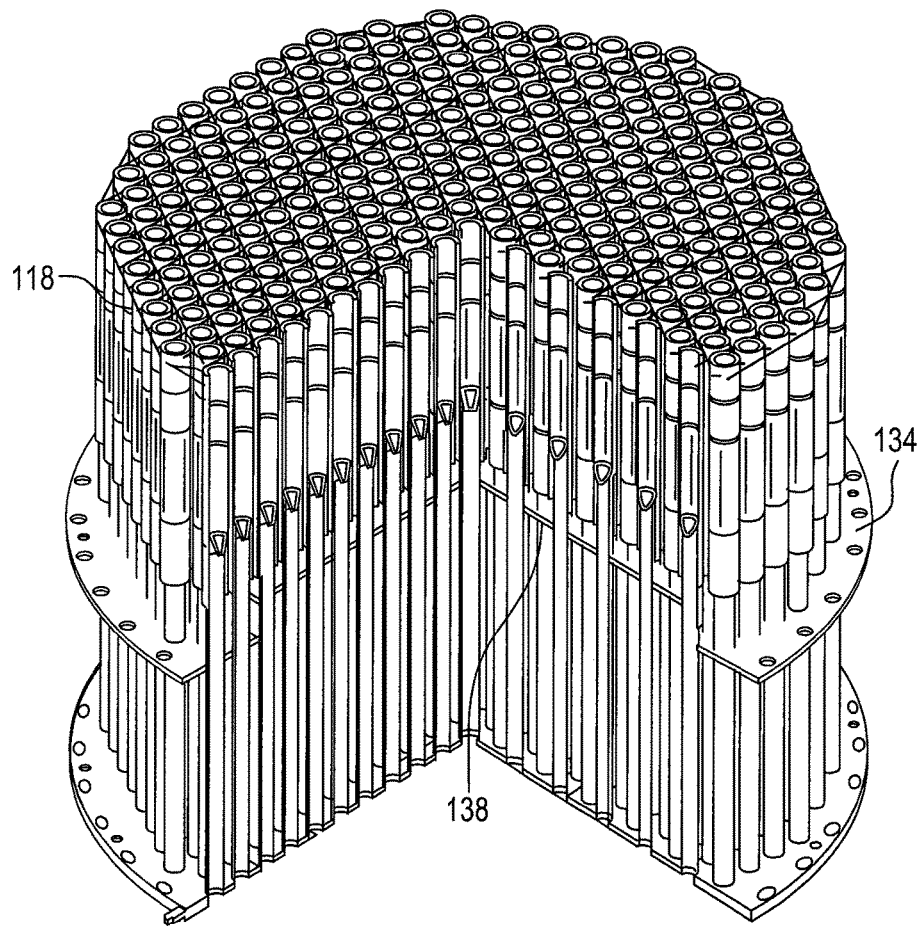
FIGS. 9-10 are a perspective view and a cross-sectional view, respectively, of a portion of a reactor pressure vessel assembly according to an example embodiment.
Figure 10:
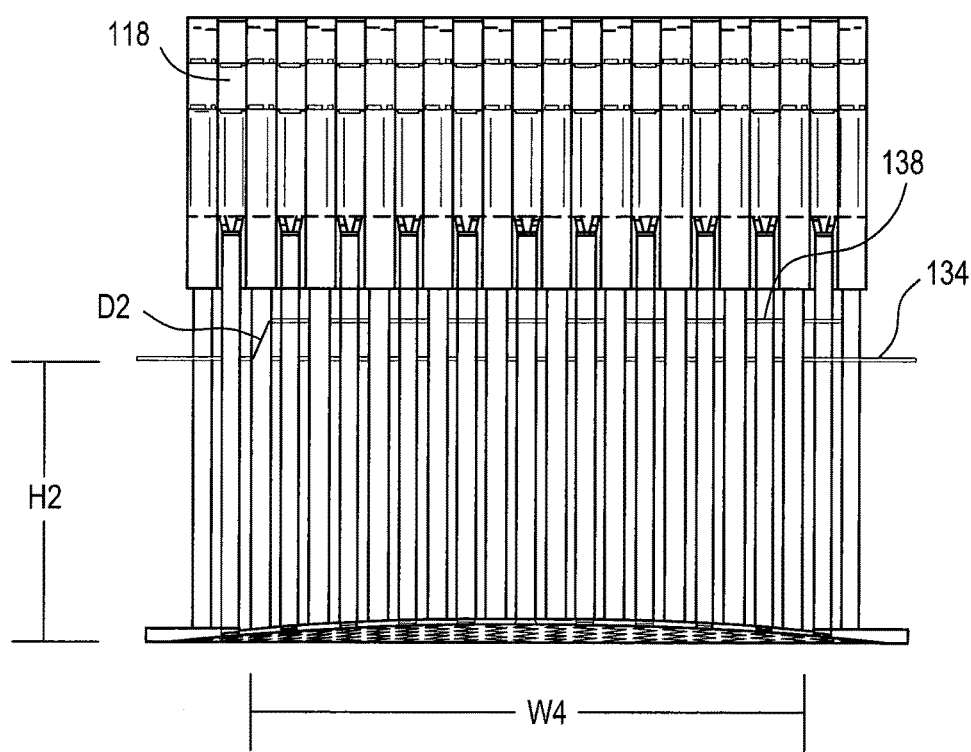
Figure 11:
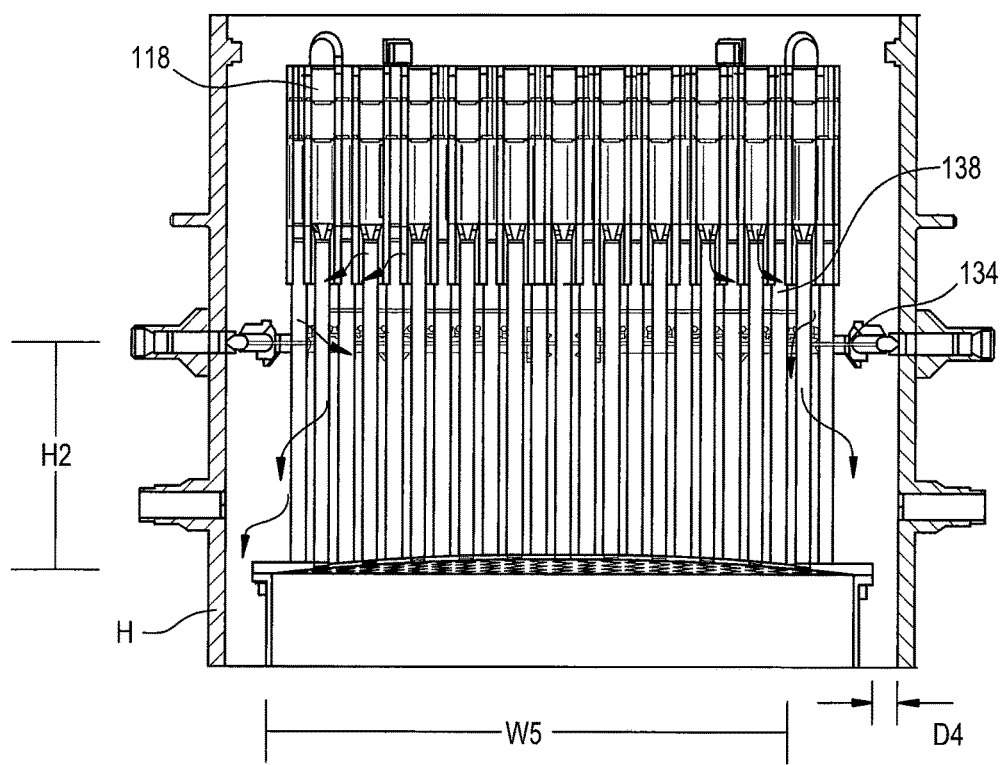
FIG. 11 is a cross-sectional view of a different portion of the reactor pressure vessel assembly in FIGS. 9-10.

FIGS. 9-10 are a perspective view and a cross-sectional view, respectively, of a portion of a reactor pressure vessel assembly according to an example embodiment. FIG. 11 is a cross-sectional view of a different portion of the reactor pressure vessel assembly in FIGS. 9-10. Although not illustrated, the portion of the reactor pressure vessel assembly in FIGS. 9-10 and/or 11 may further include the support plate 128 described previously in FIGS. 1-4. However, a non-limiting example is described below where the support plate 128 is omitted in order to avoid obscuring features of the portion of the reactor pressure vessel assembly in FIGS. 9-10 and/or 11.

Referring to FIGS. 9-10, the portion of the reactor vessel assembly in FIGS. 9-10 is the same as the portion of the reactor vessel assembly in FIG. 5-6, except the portion of the reactor vessel assembly in FIGS. 9-10 further includes an upper dam 138 positioned in the housing H between the steam separators 118 and the chimney assembly 108 (e.g. chimney head CH). The upper dam 138 may also be referred to as an upper plate or upper dam plate. A vertical distance between the upper dam 138 and the top of the chimney assembly 108 is different than a vertical distance between the flow barrier plate 134 and the top of the chimney assembly 108. For example, a height of the upper dam 138 above the chimney assembly 108 (e.g., chimney head CH) may be greater than a height H2 of the flow barrier plate 134 above the chimney assembly 108 (e.g., chimney head CH). A width W5 of the upper dam 138 may be less than the width W3 of an inner surface of the flow barrier plate 134. The width W5 of the upper dam 138 may correspond to the outer diameter of the lower dam 138 if the upper dam 138 has a circular shape.

The position of the upper dam 138 may be adjusted so the diagonal distance D2 between an edge of the upper dam 138 and an inner surface of the flow barrier plate 134 is tight enough to channel flow of the separator downcomer flow, but wide enough so the diagonal distance D2 is not too restrictive and/or does not create too much differential pressure as the separator downcomer flow is transported through the diagonal distance D2. For example, the position of the upper dam 138 may be adjusted so the diagonal distance D2 between the edge of the upper dam 138 and the inner surface of the flow barrier plate 134 may be greater than or equal to a width of the annulus A. The diagonal distance D2 may be greater than or equal to a flow area of the annulus A in the horizontal direction between the outer surface of the shroud 104 and the inner surface of the housing H. The diagonal distance D2 between the edge of the upper dam 138 and the inner surface of the flow barrier plate 134 may be about equal to the horizontal distance between an outer edge of the flow barrier plate 134 and an inner surface of the housing H.

Referring to FIG. 11, the arrows in FIG. 11 illustrate how the upper dam 138 and flow barrier plate 134 redirect the flow of the separator downcomer flow around the upper dam 138 and flow barrier plate 134 through the diagonal distance D2 between the edge of the upper dam 138 and the inner surface of the flow barrier plate 134 into the annulus A. The diagonal distance D2 (see FIGS. 9-10) between the edge of the upper dam 138 and the inner surface of the flow barrier plate 134 may be greater than or equal to the horizontal distance D4 between the outer surface of the chimney head CH and the inner surface of the housing H.

As discussed above with reference to FIGS. 7-8 and 9-11, a dam plate may be in the housing H between the chimney assembly 108 and the steam separators 118. A distance between the outer edge of the dam plate and the inner surface of housing may be greater than or equal to a distance between the outer edge of the flow barrier plate 134 and the inner surface of the housing. A vertical distance between the dam plate and the top of the chimney assembly 108 may be different than the vertical distance between the flow barrier plate 134 and the top of the chimney assembly 108. For example, in the case of the upper dam 138 illustrated in FIGS. 9-11, the vertical distance between the upper dam 138 and the top of the chimney of the chimney assembly 108 is greater than the vertical distance between the flow barrier plate 134 and the top of the chimney assembly 108. Alternatively, in the case of the lower dam 136 illustrated in FIGS. 7-8, the vertical distance between the lower dam 136 and the top of the chimney assembly 108 is less than the vertical distance between the flow barrier plate 134 and the top of the chimney assembly 108. The lower dam 136 and/or the upper dam 138 may be formed of steel such as type 304 or 316 stainless steel, but example embodiments are not limited to these materials.

Figure 12:
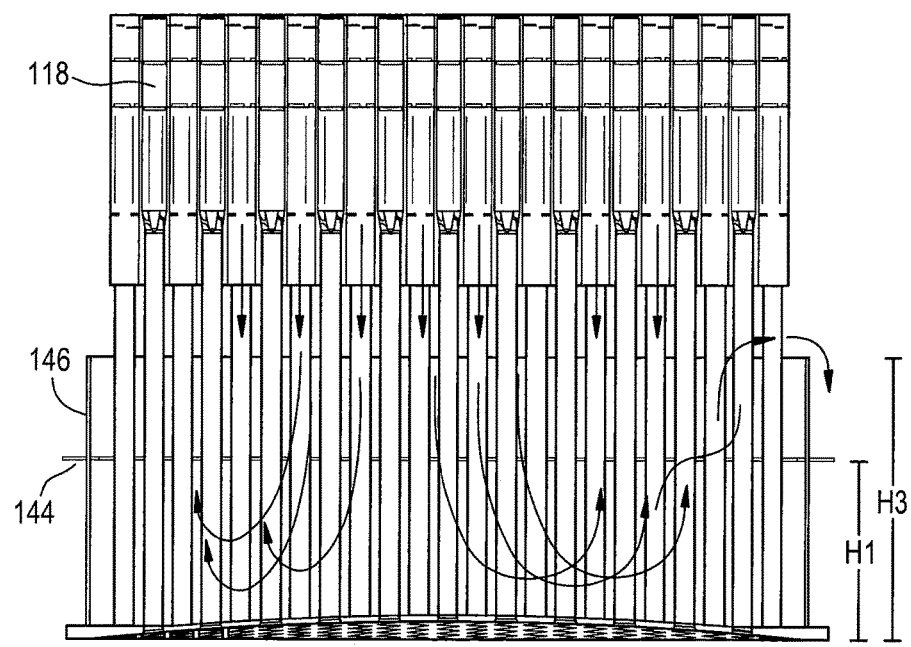
FIGS. 12-13 are a cross-sectional view and a perspective view of a portion of a reactor pressure vessel assembly according to an example embodiment.
Figure 13:
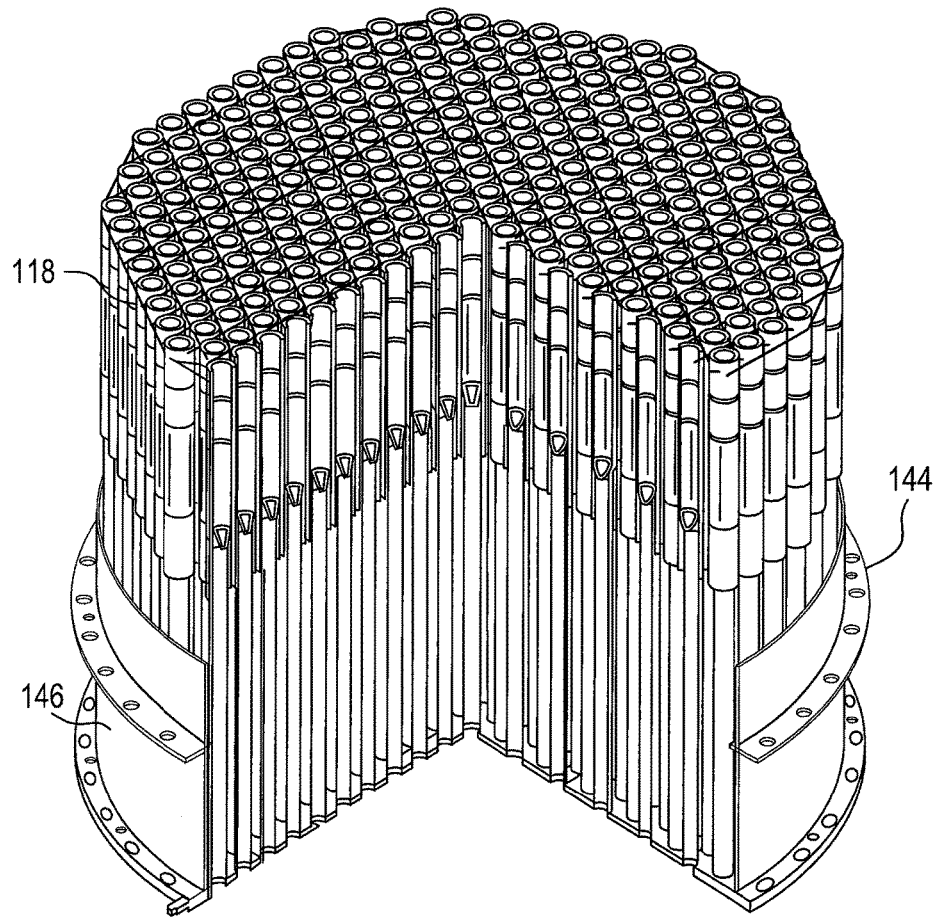
Figure 14:
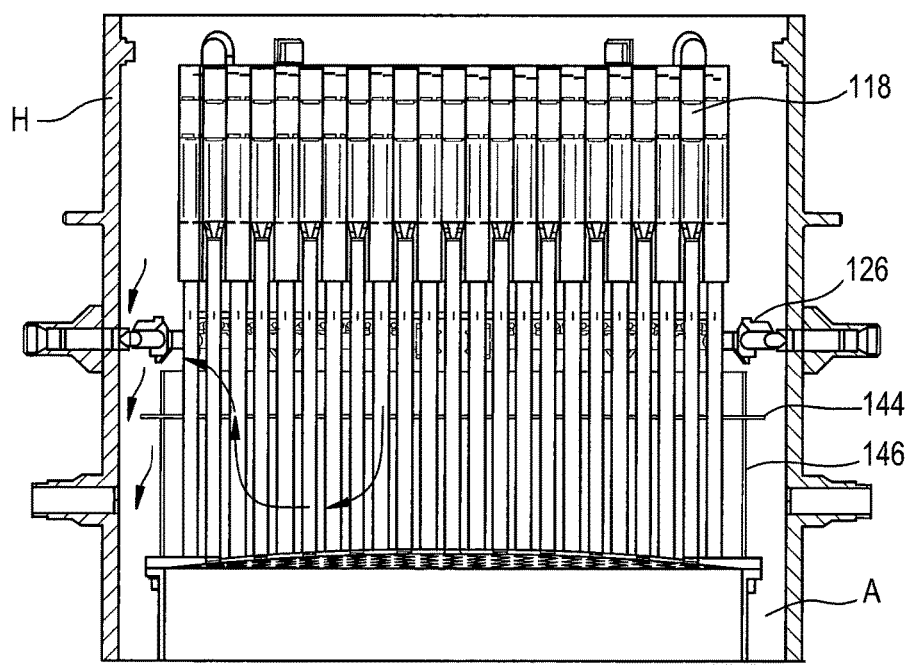
FIG. 14 is a cross-sectional view of a different portion of the reactor pressure vessel assembly in FIGS. 12-13.

FIGS. 12-13 are a cross-sectional view and a perspective view of a portion of a reactor pressure vessel assembly according to an example embodiment. FIG. 14 is a cross-sectional view of a different portion of the reactor pressure vessel assembly in FIGS. 12-13. The support plate 128 described previously with reference to FIGS. 1-4 may be omitted in the portion of the reactor pressure vessel assembly in FIGS. 12-13 and 14. Alternatively, although not illustrated, the support plate 128 may be present in the portion of the reactor pressure vessel assembly in FIGS. 12-13 and/or 14. However, a non-limiting example is described below where the support plate 128 is omitted in order to avoid obscuring features of the portion of the reactor pressure vessel assembly in FIGS. 12-13 and/or 14.

Referring to FIGS. 12-14, in an example embodiment, the portion of the reactor vessel assembly may include a flow barrier structure 146 having a tub shape. As shown by the arrows in FIGS. 12 and 14, the flow barrier structure 146 may redirect the normal flow of the separator downcomer flow up and over an outer surface (e.g., outer diameter) of the flow barrier structure 146 into the annulus A. Once in the annulus A, the redirected separator downcomer flow may be mixed with the sub-cooled feedwater that enters the annulus A through the feedwater sparger 126. As shown in FIG. 14, the feedwater sparger 126 may be just above a top of the flow barrier structure 146; therefore, a significant amount of mixing may be expected to take place within the flow barrier structure 146 before the downcomer flow and/or sub-cooled feedwater may be redirected into the annulus A, where even more mixing may be expected.

As shown by the arrows in FIG. 5, the flow barrier plate 134 redirects the normal flow path of the separator downcomer flow and enables the sub-cooled feedwater additional time to mix with the redirected separator downcomer flow in the annulus A prior to entry into the reactor core 112. Accordingly, temperature variations of the sub-cooled feedwater and redirected separator downcomer flow in the annulus may be reduced prior to entry into the reactor core 112.

A height H3 of the flow barrier structure 146 above the channel assembly may be greater than a height H1 of the support plate 128 described previously in FIGS. 1-4. The flow barrier structure 146 may be configured to redirect the separator downcomer flow past and over the at least one feedwater sparger. An upper surface of the flow barrier structure 146 may be adjacent to at least one feedwater sparger 126. Steam separator stand pipes SP (labeled in FIGS. 4 and 6) may extend from the flow barrier structure 146 to the steam separators 118.

A support plate 144 may be connected to the flow barrier structure 146 and extend from the outer surface of the flow barrier structure 144 towards the inner surface of the housing H. The support plate 144 may have a shape that is the same as or similar to the support plate 128 described previously in FIGS. 1-4. The support plate 144 may be arranged at the height H1 above the channel assembly, but the vertical position of the support plate 144 is not limited thereto and may vary. The support plate 144 may support the stand pipes SP (see FIG. 4). Although not illustrated, chimney head bolts may be used to secure the chimney head CH to the chimney barrel B. The support plate 144 may provide support to chimney head bolts (not shown). A height of the support plate 144 may be about the same height as a top of the chimney head bolts and the chimney head bolts may extend from the support plate 144 to contact the chimney head CH and chimney barrel B.

The support plate 144 and the flow barrier structure 146 may be integrally formed or formed of separate structures that are connected to each other. The flow barrier structure 146 and/or the support plate 144 may be formed of steel such as type 304 or 316 stainless steel, but example embodiments are not limited to these materials.

The diagonal distance between the upper surface of the flow barrier structure 146 and the feedwater sparger 126 may be less than or about equal to a horizontal distance between the outer surface of the support plate 144 (e.g., outer diameter of the support plate 144 if the support plate 144 has a ring shape) and the inner surface of the housing H.

Figure 15:
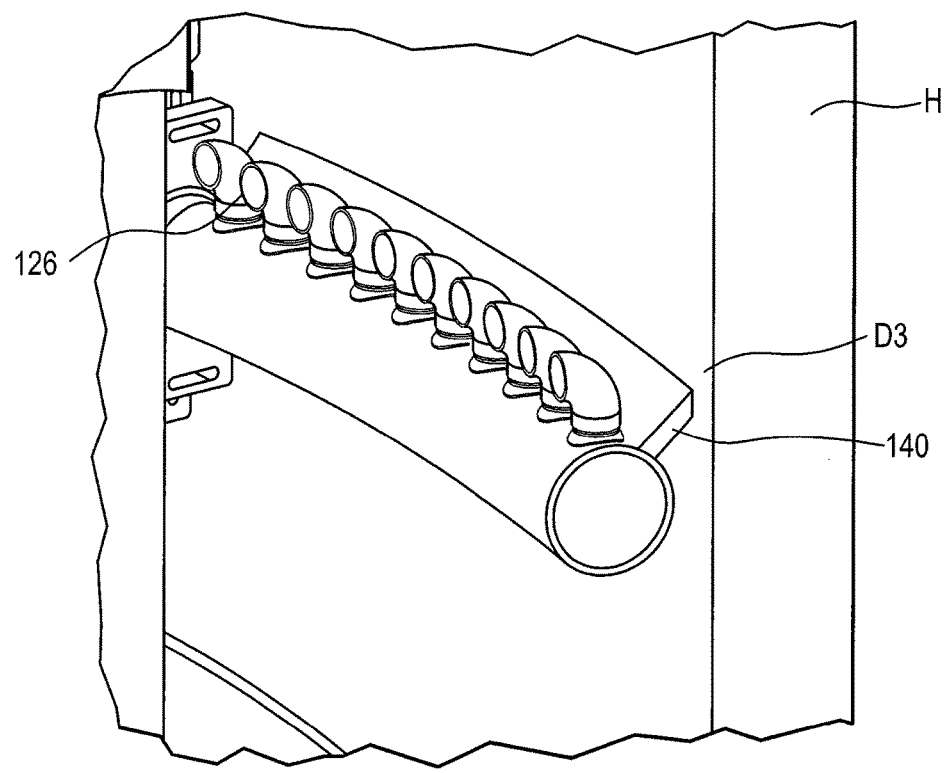
FIG. 15 is a cross-sectional view of a portion of a reactor pressure vessel assembly according to an example embodiment.

FIG. 15 is a cross-sectional view of a portion of a reactor pressure vessel assembly according to an example embodiment. Referring to FIG. 15, in an example embodiment, the reactor pressure vessel assembly may include a backflow dam 140 on the feedwater sparger 126. The back flow dam 140 may be formed of steel such as type 304 or 316 stainless steel, but example embodiments are not limited to these materials. The backflow dam 140 may be connected to the feedwater sparger 126. For example, the back flow dam 140 may be welded to the feedwater sparger 126. The backflow dam 140 may cover a top of the annulus A. An edge of the back flow dam may be spaced apart from the inner surface of the housing H. A clearance between the backflow dam 140 and the inner surface of the housing H, as illustrated by the distance D3 in FIG. 15, may about ¼ inch to ½ inch, but example embodiments are not limited thereto.

Figure 16:
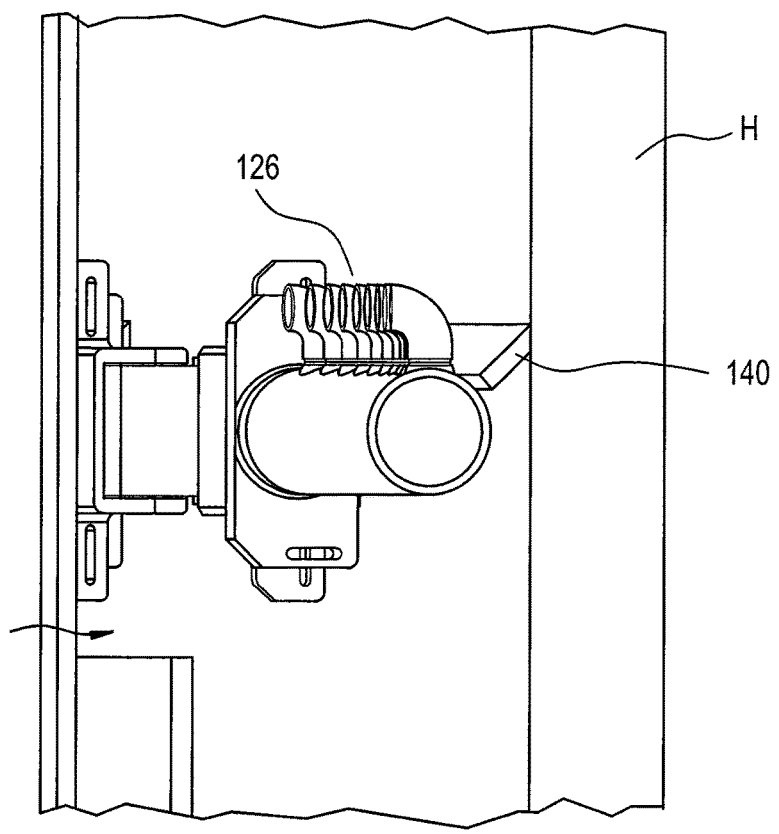
FIG. 16 is a cross-sectional view of a portion of a reactor pressure vessel assembly according to an example embodiment.

FIG. 16 is a cross-sectional view of a portion of a reactor pressure vessel assembly according to an example embodiment. Referring to FIG. 16, in an example embodiment, the reactor pressure vessel assembly may be the same as the reactor pressure vessel assembly in FIG. 15, except the backflow dam 140 may be connected to the inner surface of the housing H. When the backflow dam 140 is connected to the inner surface of the housing H, the flow barrier structure 146 redirects the separator downcomer flow through a space between the flow barrier structure 146 and feedwater sparger 126.

Figure 17:
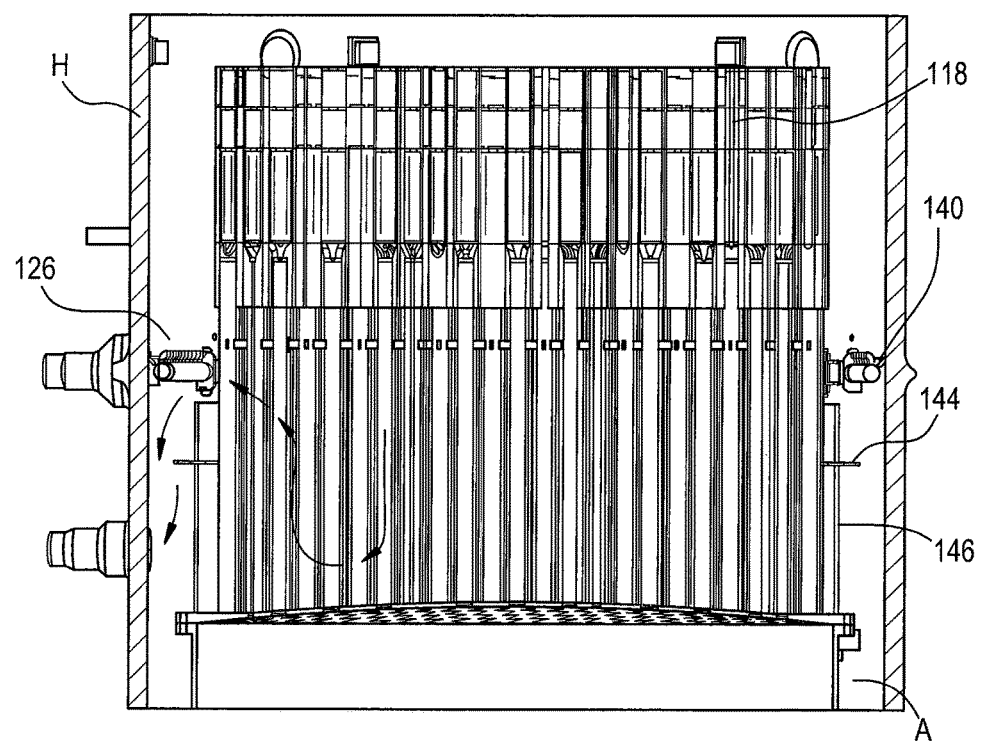
FIG. 17 is a cross-sectional view of a portion of a reactor pressure vessel assembly according to an example embodiment.

FIG. 17 is a cross-sectional view of a portion of a reactor pressure vessel assembly according to an example embodiment. Although not illustrated, the support plate 128 described previously in FIGS. 1-4 may be present in the portion of the reactor pressure vessel assembly in FIG. 17. However, a non-limiting example is described below where the support plate 128 is omitted in order to avoid obscuring features of the portion of the reactor pressure vessel assembly in FIG. 17.

Referring to FIG. 17, in an example embodiment, the reactor pressure vessel assembly may be the same as the reactor pressure vessel assembly described with reference to FIGS. 12-14, except the reactor pressure vessel assembly in FIG. 17 may further include at least one backflow dam 140 on a corresponding one of the feedwater spargers 126. The back flow dam 140 may cover a top of the annulus A. The back flow dam 140 may be spaced apart from the inner surface of the housing H or connected to the inner surface of the housing H. Alternatively, the reactor pressure vessel assembly in FIG. 17 may include a plurality of backflow dams 140 on a plurality of feedwater spargers 126, respectively. All of the backflow dams 140 may be spaced apart from the inner surface of the housing H or connected to the inner surface of the housing H. Alternatively, some of the backflow dams 140 may be spaced apart from the inner surface of the housing H and other backflow dams 140 may be connected to the inner surface of the housing H. The arrows in FIG. 17 illustrate how the flow barrier structure 146 may redirect the normal path of the downcomer separator flow into the annulus A.

Although FIGS. 16 and 17 have been described in non-limiting examples where the reactor pressure vessel assembly includes the flow barrier structure 146, example embodiments are not limited thereto. According to some example embodiments, the reactor pressure vessel assemblies described previously with reference to FIGS. 5-6 and/or 7-8 and 9-11 may be modified to include the backflow dam 140 on some or all of the feedwater spargers 126. Additionally, the back flow dam 140 may be spaced apart from the inner surface of the housing H or connected to the inner surface of the housing H.

In an example embodiment, referring to FIG. 1 and FIGS. 5-6, a method of manufacturing a reactor pressure vessel assembly includes disposing the steam separators 118 over the reactor core 112, disposing a chimney assembly 108 between the reactor core 112 and the steam separators 118, disposing a housing H surrounding the reactor core 112, the chimney assembly 108, the steam separators 118, disposing at least one feedwater sparger 126 in the housing H, and disposing a flow barrier structure in the housing H. An inner surface of the chimney assembly 108 and an inner surface of the reactor core 112 define a conduit for transporting a gas-liquid two phase flow stream from the reactor core 112 through the chimney assembly 108 to the steam separators 118. The housing defines at least one feedwater opening. An inner surface of the housing H, an outer surface of the chimney assembly 108 (e.g., chimney barrel B), and an outer surface of the reactor core 112 (e.g., shroud 104) defined an annulus A in fluid communication with the at least one feedwater opening. The method may further include connecting each feedwater sparger 126 to a corresponding feedwater opening. Each feedwater sparger 126 is configured to deliver a sub-cooled feedwater into the annulus A.

The flow barrier structure may be the flow barrier plate 134 in FIGS. 5-6 or the flow barrier structure 146 described in FIG. 14. The flow barrier structure may be spaced apart in a vertical direction over the chimney assembly 108 and below the steam separators 118. The flow barrier structure may be configured to force mixing between the sub-cooled feedwater and a downcomer fluid from the steam separators such as the separator downcomer flow.

If the flow barrier structure is the flow barrier plate 134, the method may further include placing a dam plate in the housing H between the chimney assembly 108 and the steam separators 118. A distance between an outer edge of the dam plate and the inner surface of the housing H may be equal to or greater than a distance between an outer edge of the flow barrier plate 134 and the inner surface of the housing H.

A vertical distance between the dam plate and a top of the chimney assembly 108 may be different than a vertical distance between the flow barrier plate 134 and the top of the chimney assembly 108. For example, if the lower dam 136 described in FIGS. 7-8 is used as the dam plate, a vertical distance between the lower dam 136 and the top of the chimney assembly 108 may be less than a vertical distance between the flow barrier plate 134 and the top of the chimney assembly 108. Alternatively, if the upper dam 138 described in FIGS. 9-10 is used as the dam plate, a vertical distance between the upper dam 138 and the top of the chimney assembly 108 may be greater than a vertical distance between the flow barrier plate 134 and the top of the chimney assembly 108.

Descriptions and/or features in each of the above-described reactor pressure vessel assemblies according to example embodiments and/or portions thereof should be considered as available in other reactor pressure vessel assemblies according to example embodiments and/or portions thereof.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A reactor pressure vessel assembly, comprising:
   a reactor core;
   steam separators over the reactor core;
   a chimney between the reactor core and the steam separators, an inner surface of the chimney and an inner surface of the reactor core defining a conduit for transport of a gas-liquid two phase flow stream from the reactor core through the chimney to the steam separators;
   a housing surrounding the reactor core, the chimney, and the steam separators,
   the housing defining at least one feedwater opening,
   an inner surface of the housing, an outer surface of the chimney, and an outer surface of the reactor core defining an annulus in fluid communication with the at least one feedwater opening and the conduit;
   at least one feedwater sparger in the housing, each feedwater sparger being connected to a corresponding one of the at least one feedwater opening, each feedwater sparger being configured to deliver a sub-cooled feedwater into the annulus; and
   a flow barrier structure in the housing, the flow barrier structure being over the chimney and below the steam separators, the flow barrier structure being spaced apart from the chimney and the steam separators in a vertical direction, the flow barrier structure being configured to force mixing between the sub-cooled feedwater and a downcomer fluid from the steam separators, and at least one of the steam separators being directly vertically over a portion of the flow barrier structure in a plan view.

2. The reactor pressure vessel assembly of claim 1, wherein
   the flow barrier structure has a ring shape, and
   a height of the flow barrier structure in the housing is about level with the at least one feedwater sparger.

3. The reactor pressure vessel assembly of claim 1, wherein the flow barrier structure includes stainless steel.

4. The reactor pressure vessel assembly of claim 1, wherein
the at least one feedwater sparger is a plurality of feedwater spargers arranged in a circular pattern over the chimney,
the at least one feedwater opening is a plurality of feedwater openings defined by the housing, and
the feedwater spargers are connected to the feedwater openings.

5. The reactor pressure vessel assembly of claim 1, further comprising:
a dam plate in the housing between the chimney and the steam separators, wherein
a distance between an outer edge of the dam plate and the inner surface of the housing is greater than or equal to a distance between an outer edge of the flow barrier structure and the inner surface of the housing, and
a vertical distance between the dam plate and a top of the chimney is different than a vertical distance between the flow barrier structure and the top of the chimney.

6. The reactor pressure vessel assembly of claim 5, wherein the vertical distance between the dam plate and the top of the chimney is less than the vertical distance between the flow barrier structure and the top of the chimney.

7. The reactor pressure vessel assembly of claim 5, wherein the vertical distance between the dam plate and the top of the chimney is greater than the vertical distance between the flow barrier structure and the top of the chimney.

8. The reactor pressure vessel assembly of claim 7, wherein a diagonal distance between the outer edge of the dam plate and an inner surface of the flow barrier structure is equal to or greater than a width of the annulus.

9. The reactor pressure vessel assembly of claim 1, further comprising:
a backflow dam on the at least one feedwater sparger, wherein
the backflow dam covers a top of the annulus.

10. The reactor pressure vessel assembly of claim 9, wherein an edge of the backflow dam is one of spaced apart from the inner surface of the housing and connected to the inner surface of the housing.

11. The reactor pressure vessel assembly of claim 1, wherein the flow barrier structure is configured to force the downcomer fluid past and over the at least one feedwater sparger.

12. A reactor pressure vessel assembly, comprising:
a reactor core;
steam separators over the reactor core, an inner surface of the reactor core defining a conduit for transport of a gas-liquid two phase flow stream from the reactor core to the steam separators;
a housing surrounding the reactor core and the steam separators,
the housing defining at least one feedwater opening,
an inner surface of the housing and an outer surface of the reactor core defining an annulus in fluid communication with the at least one feedwater opening and the conduit;
at least one feedwater sparger in the housing, each feedwater sparger being connected to a corresponding one of the at least one feedwater opening, each feedwater sparger being configured to deliver a sub-cooled feedwater into the annulus; and
a flow barrier structure in the housing below the steam separators, the flow barrier structure being configured to force mixing between the sub-cooled feedwater and a downcomer fluid from the steam separators, a top of the flow barrier structure in the housing being about level with the at least one sparger, and at least one of the steam separators being directly vertically over a portion of the flow barrier structure in a plan view.

13. The reactor pressure vessel assembly of claim 12, wherein the flow barrier structure has a ring shape.

14. The reactor pressure vessel assembly of claim 12, further comprising:
a dam plate in the housing between the reactor core and the steam separators, wherein
a distance between an outer edge of the dam plate and the inner surface of the housing is equal to or greater than a distance between an outer edge of the flow barrier structure and the inner surface of the housing, and
a vertical distance between the dam plate and a top of the reactor core is different than a vertical distance between the flow barrier structure and the top of the reactor core.

15. A method of manufacturing a reactor pressure vessel assembly, comprising:
disposing steam separators over a reactor core;
disposing a chimney between the reactor core and the steam separators, an inner surface of the chimney and an inner surface of the reactor core defining a conduit for transport of a gas-liquid two phase flow stream from the reactor core through the chimney to the steam separators;
disposing a housing surrounding the reactor core, the chimney, and the steam separators,
the housing defining at least one feedwater opening,
an inner surface of the housing, an outer surface of the chimney, and an outer surface of the reactor core defining an annulus in fluid communication with the at least one feedwater opening and the conduit;
disposing at least one feedwater sparger in the housing;
connecting each feedwater sparger to a corresponding one of the at least one feedwater opening, each feedwater sparger being configured to deliver a sub-cooled feedwater into the annulus; and
disposing a flow barrier structure in the housing, the flow barrier structure being over the chimney and below the steam separators, the flow barrier structure being spaced apart from the chimney and the steam separators in a vertical direction, the flow barrier structure being configured to force mixing between the sub-cooled feedwater and a downcomer fluid from the steam separators, and at least one of the steam separators being directly vertically over a portion of the flow barrier structure in a plan view.

16. The method of claim 15, wherein
the flow barrier structure has a ring shape, and
the disposing the flow barrier structure includes arranging the flow barrier structure at a height in the housing that is about level with the at least one feedwater sparger.

17. The method of claim 15, wherein the flow barrier structure includes stainless steel.

18. The method of claim 15, wherein the flow barrier structure is configured to force the downcomer fluid past and over the at least one feedwater sparger.

19. The method of claim 15, further comprising:
placing a dam plate in the housing between the chimney and the steam separators, wherein
a distance between an outer edge of the dam plate and the inner surface of the housing is equal to or greater than a distance between an outer edge of the flow barrier structure and the inner surface of the housing, and a vertical distance between the dam plate and a top of the chimney is different than a vertical distance between the flow barrier structure and the top of the chimney.

20. The method of claim 19, wherein the vertical distance between the dam plate and the top of the chimney is greater than the vertical distance between the flow barrier structure and the top of the chimney, and a diagonal distance between the outer edge of the dam plate and an inner surface of the flow barrier structure is greater than a width of the annulus.

* * * * *